(12) United States Patent
Nelson

(10) Patent No.: US 6,178,312 B1
(45) Date of Patent: Jan. 23, 2001

(54) MECHANISM FOR AUTOMATICALLY TUNING TRANSCEIVER FREQUENCY SYNTHESIZER TO FREQUENCY OF TRANSMIT/RECEIVER FILTER

(75) Inventor: David Paul Nelson, Huntsville, AL (US)

(73) Assignee: Adtran, Inc., Huntsville, AL (US)

( * ) Notice: Under 35 U.S.C. 154(b), the term of this patent shall be extended for 0 days.

(21) Appl. No.: 09/232,453

(22) Filed: Jan. 15, 1999

(51) Int. Cl.⁷ ........................................ H03C 3/00
(52) U.S. Cl. ............................ 455/109; 455/203
(58) Field of Search ..................... 455/44, 45, 73, 455/78, 108, 109, 203, 204, 206; 370/480, 496, 497, 488; 375/219, 220

(56) References Cited

U.S. PATENT DOCUMENTS 5,481,186  1/1996  Heutmaker et al. ............... 324/158.1
5,781,860 * 7/1998  Lopponen et al. .................. 455/426

* cited by examiner

*Primary Examiner*—Nguyen Vo
*Assistant Examiner*—N. Mehrpour
(74) *Attorney, Agent, or Firm*—Allen, Dyer, Doppelt, Milbrath & Gilchrist, P.A.

(57) ABSTRACT

Frequency synthesizers of a radio transceiver are automatically tuned so that its transmit and receive frequencies correspond to whichever upper band and lower band filters the radio transceiver has been connected by the user. A capacitive electrical impedance interface is coupled to filter circuitry of an upper band filter section, while an inductive electrical impedance interface is coupled to filter circuitry of the lower based filter section. A voltage reference circuit is coupled to one of the transmit port and the receive port of the transceiver. A controller is operative to automatically tune the transceiver to transmit in one of the upper and lower frequency bands, and to receive on the other frequency band, in accordance with the voltage level generated by the voltage reference circuit.

11 Claims, 1 Drawing Sheet

Tx WEST    Rx WEST
Rx EAST    Tx EAST

MECHANISM FOR AUTOMATICALLY TUNING TRANSCEIVER FREQUENCY SYNTHESIZER TO FREQUENCY OF TRANSMIT/RECEIVER FILTER

FIELD OF THE INVENTION

The present invention relates in general to communication systems, and is particularly directed to a new and improved mechanism for automatically tuning the frequency synthesizer of a radio transceiver, such that its transmit and receive frequencies correspond to those of respectively different (upper band and lower band) filters to which the radio transceiver has been connected.

BACKGROUND OF THE INVENTION

Because the majority of users of electronic devices are technically unsophisticated, telecommunication service providers are continually seeking ways to make installation, set up and use of their equipment as simple as possible. In the course of setting up radio transceiver equipment at a respective end of a two way radio link, such as is diagrammatically illustrated in FIG. 1, for example, interference may be encountered. To avoid this interference or other reasons, the customer may be required to change the transmit and receive frequencies from one assigned plan to another in order to achieve satisfactory system operation. When this situation is encountered, the customer is customarily required to perform three tasks.

The first is to connect the radio's antenna 11 to the antenna port 13 of a diplexer 15 containing transmit and receiver filters for the radio 17, proper.

The user is also required to connect the radio's transmitter and receiver ports 21, 23 to filter ports 31, 33 of the diplexer 15, as specified on a frequency assignment plan for that customer's end of the link.

Finally, the user must tune the radio's frequency transmit and receiver synthesizers to the respective frequency bands of the diplexer filters, in order to conform with the customer's transmit and receive frequency assignment plan, such as that shown in FIG. 2. In the frequency assignment example of FIG. 2, the radio 17 at a 'west' end of the radio link is to be configured to transmit within a first 'lower' frequency $F_L$ band 41, and to receive within a second 'upper' $F_H$ frequency band 43. Conversely, a radio at the 'east' end of the link is to transmit within the 'upper' frequency $F_H$ band 41, and to receive within the 'lower' $F_L$ frequency band 43.

While the first two steps involve the user only making physical connections between components, and are essentially foolproof, the third step requires the user to make a pair of parametric adjustments to set the operation of the radio, and often results in a set-up failure. This, in turn, leads to the customer calling the service provider and the need to inject service personnel into the process.

SUMMARY OF THE INVENTION

In accordance with the present invention, this problem is effectively obviated by incorporating a pair of relatively simple, complementary impedance coupling circuits into the diplexer's filter stages, and modifying the transceiver to include a logic level generator circuit, having a frequency band monitor node which indicates to which filter ports of the diplexer the customer has connected the radio's transmit and receive ports. The output of the logic level generator circuit is read by the transceiver's control processor to automatically tune the transmitter and receiver frequency synthesizers to the respective frequencies of the diplexer filters as connected by the customer.

For this purpose, the upper band filter stage of the diplexer includes a capacitive-coupling interface circuit that provides a first, low impedance path between an upper band filter port and the upper band filter stage's tuned cavity at the operative frequency band of the filter, while effectively blocking DC. The lower band filter stage includes an inductive-coupling interface circuit which, in addition to providing a low impedance connection between the lower band filter port and the tuned cavity of the lower band filter stage, provides a DC path to ground.

The logic level generator may comprise a pull-up resistor coupled between a high voltage reference terminal and a frequency band monitoring node that is ported to an input/output bus of the radio's control processor. The frequency band monitoring node is further coupled to a transceiver's (transmit or receive) port through a relatively low value coupling resistor or inductor, which forms a voltage divider with the pull-up resistor.

In operation, once the customer has connected the diplexer's filter ports to transmit and receive ports of the transceiver as specified in the radio's frequency assignment plan, the voltage reference circuit will provide either a relatively high voltage associated with the upper frequency band $F_H$, or a relatively low voltage associated with the lower frequency band $F_L$, depending upon how the user has wired up the equipment. If the transceiver port of interest has been connected to the diplexer's upper band filter port, the frequency band monitoring node will have the relatively high voltage level, since the low value resistor is terminated by a DC open circuit, as a result of being coupled to the DC-blocking, capacitive-coupling interface circuit of the upper band filter stage. Since the high voltage level is representative of the upper frequency band $F_H$, the control processor will tune the transmitter's frequency synthesizer to the upper frequency band $F_H$, and the receiver's frequency synthesizer to the lower frequency band $F_L$.

On the other hand, if the transceiver's transmit port has been connected to the diplexer's lower band filter port, the frequency band monitoring node will be coupled through the low value resistor and the DC path through the inductive-coupling interface circuit of the lower frequency band filter stage to ground. Because the value of low value resistor is considerably smaller than that of the pull-up resistor, the frequency band monitoring node is effectively coupled to the low voltage level, and the control processor will tune the transmitter's frequency synthesizer to the lower frequency band $F_L$, and the receiver's frequency synthesizer to the upper frequency band $F_H$.

DETAILED DESCRIPTION

Figure 1:
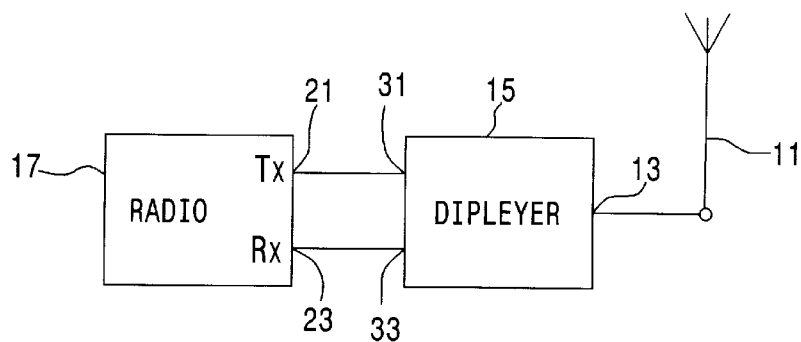
FIG. 1 diagrammatically illustrates radio transceiver equipment for a two-way radio link.

Before describing in detail the automatic frequency synthesizer tuning mechanism of the present invention, it should be observed that the invention resides primarily in a prescribed arrangement of conventional communication circuits and associated digital signal processing components therefor, that control the operation of such circuits. Consequently, the configuration of such circuits and components and the manner in which they are interfaced with other communication system equipment have, for the most part, been illustrated in the drawings by a readily understandable block diagram, which shows only those specific details that are pertinent to the present invention, so as not to obscure the disclosure with details which will be readily apparent to those skilled in the art having the benefit of the description herein. Thus, the block diagram illustration to be described is intended to show the major components of the invention in a convenient functional grouping, whereby the present invention may be more readily understood.

Figure 2:
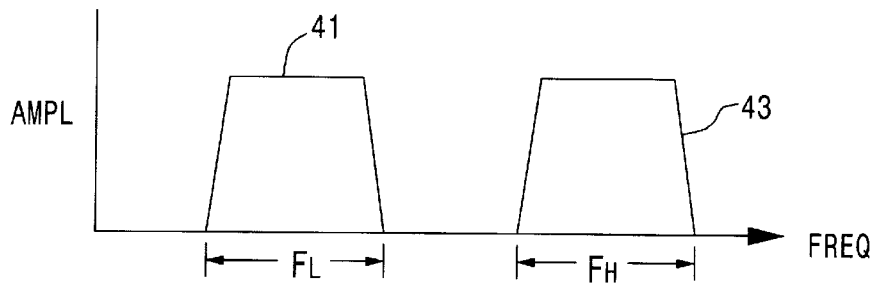
FIG. 2 shows a transmit/receive frequency assignment plan for west and east radios of a two-way link.
Figure 3:
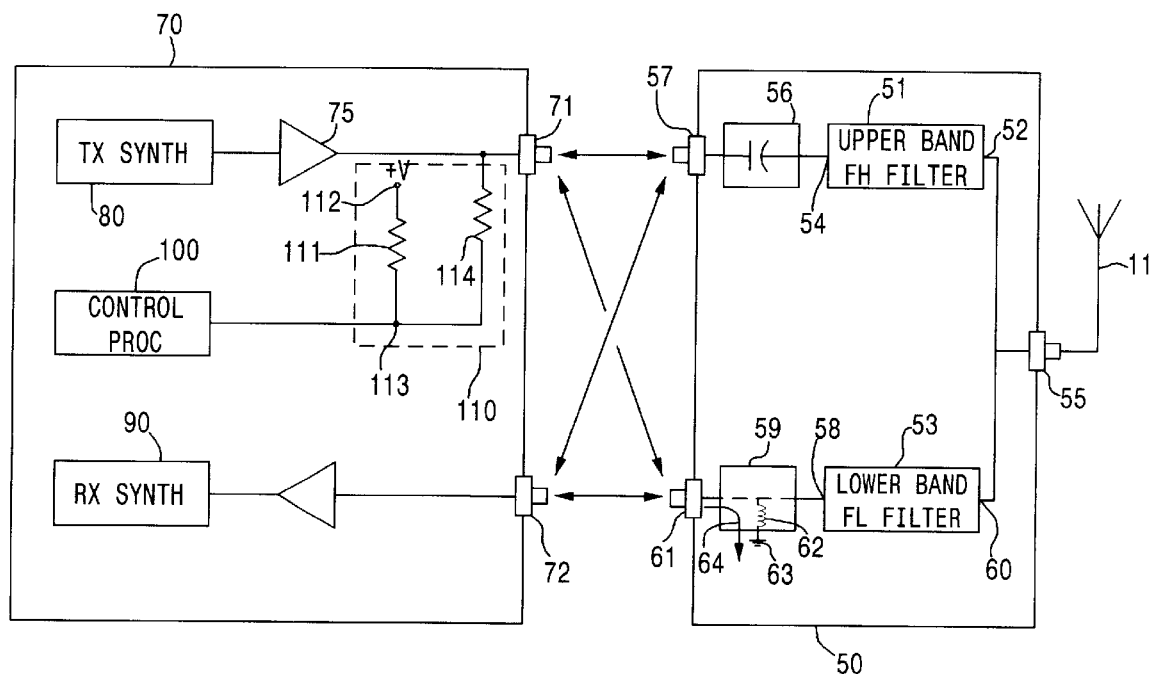
FIG. 3 diagrammatically illustrates modifications to a transceiver and filter stages of a diplexer for implementing the automatic frequency synthesizer tuning mechanism of the present invention.

Reference is now directed to FIG. 3, which illustrates the manner in which an upper band filter stage 51 and a lower band filter stage 53 of a diplexer unit 50, as well as the radio transceiver 70 itself may be modified in accordance with the present invention, to automatically tune respective transmitter and receiver frequency synthesizers 80 and 90 of the radio to the respective frequencies of the diplexer's filter stages 51 and 53, as connected to the radio by the customer in accordance with a specified frequency plan. With reference to the frequency plan example of FIG. 2, respective transmitter and receiver frequency synthesizers 80 and 90 are to be controllably tunable by the radio's microcontroller (control processor) 100 to transmit in one of the upper frequency band $F_H$ and the lower frequency band $F_L$ and to receive on the other of the upper frequency band and the lower frequency band.

Within the diplexer unit 50, the upper band filter stage 51, which may be configured as a tuned cavity, is operative to pass signals in the upper frequency band $F_H$ and to effectively block signals in the lower frequency band $F_L$. The upper band filter stage 51 has a first end 52 coupled to an antenna port 55, which the customer connects to the antenna, as described above. The upper band filter stage 51 has a second end 54, which is coupled through a capacitive-coupling interface circuit 56 to an upper band filter port 57. The capacitive-coupling interface circuit 56 serves to provide a first, low impedance path (effective direct electrical connection) between the upper band filter port 57 and the upper band filter stage's tuned cavity at the operative frequency band of the filter, and to effectively block DC. The upper band filter port 57 is to be connected by the customer to one of the transmit and receive ports 71, 72 of the transceiver 70, in accordance with the radio's assigned transmit/receive frequency plan, as described above.

Similarly, the lower band filter stage 53, which may also be configured as a tuned cavity, is operative to pass signals in the lower frequency band $F_L$ and to effectively block signals in the upper frequency band $F_H$. The lower band filter stage 53 has a first end 60 coupled to the antenna port 55, and a second end 58 coupled through an inductive-coupling interface circuit 59 to a lower band filter port 61, that is to be connected by the customer to the other of the transmit and receive ports 71, 72 of the transceiver 70. The inductive-coupling interface circuit 59 of the lower band filter stage 53 includes an inductor 62 that is coupled to a reference potential terminal 63 (e.g., ground). In addition to providing, at the operative frequency band of the filter, a low impedance connection between the lower band filter port 61 and the tuned cavity of the lower band filter stage 53, the inductive-coupling interface circuit 59 provides a DC path 64 between the lower band filter port 61 and ground 63, while blocking signals in the upper and lower frequency bands between port 61 and ground.

As will be described, this DC path 64 is used to terminate a voltage reference circuit 110 installed in the transceiver 70, and is coupled to one of the transceiver's transmit and receive ports. For purposes of providing a non-limiting example, the voltage reference circuit 110 is shown as being connected to the transceiver transmit port 71, to which the output of an RF power amplifier 75 of the radio's transmitter section is coupled. It should be realized, however, that the voltage reference circuit 110 may be connected alteratively to transceiver receive port 72, that is coupled to the radio's receiver section.

The voltage reference circuit 110 is operative to provide either a relatively high voltage +V (e.g., +(3–5) volts) associated with a first logic level, or a relatively low voltage (e.g., zero volts), associated with a second logic level. Each logic level is representative of a respective one of the upper frequency band $F_H$ and the lower frequency band $F_L$. In the present example, the first logic level is representative of the upper frequency band $F_H$ and the second logic level is representative of the lower frequency band $F_L$.

For this purpose, the voltage reference circuit 110 may comprise a relatively high value pull-up resistor 111 that is coupled between a high voltage reference terminal 112, to which a voltage +V on the order of +3 v–+5 v may be applied, and a frequency band monitoring node 113 that is ported to an input/output bus of the control processor 100. The frequency band monitoring node 113 is DC-coupled to the transceiver's transmit port 71 through a relatively low value coupling resistor (or inductor) 114, which forms a voltage divider with pull-up resistor 111. The frequency band monitor node 113 serves to identify which diplexer filter stage—upper filter stage 51 or lower filter stage 53—has been connected to the transceiver's transmit port 71 by the customer.

More particularly, if the transceiver's transmit port 71 has been connected to the diplexer's upper band filter port 57, the frequency band monitoring node 113 will be at the potential of the relatively high voltage (representative of the first logic level) applied to the high voltage reference terminal 112, since the low value resistor 114 is effectively terminated by a DC open circuit, as a result of being coupled to the DC-blocking, capacitive-coupling interface circuit 56 of the upper band filter stage 51. Since the first logic level at node 113 is representative of the upper frequency band $F_H$, the control processor 100 will know that it is to tune the transmitter's frequency synthesizer to the upper frequency band $F_H$, and the receiver's frequency synthesizer to the lower frequency band $F_L$.

On the other hand, if the transceiver's transmit port 71 has been connected to the diplexer's lower band filter port 61, the frequency band monitoring node 113 will be coupled through the low value resistor 114 and the DC path 64 through the inductive-coupling interface circuit 59 of the lower frequency band filter stage 53 to ground 63. Because the value of low value resistor 114 is considerably smaller than that of pull-up resistor 111, with which it forms a voltage divider, the frequency band monitoring node 113 is now effectively coupled to zero volts (representative of the second logic level). Since, in the present example, the second logic level is representative of the lower frequency band $F_L$, the control processor 100 will tune the transmitter's frequency synthesizer to the lower frequency band $F_L$, and the receiver's frequency synthesizer to the upper frequency band $F_H$.

As will be appreciated from the foregoing description of the invention, once the customer has completed connecting the diplexer to the radio, the radio's control processor proceeds to read these connections via the frequency band monitoring node, and then automatically tunes the radio's transmitter and receiver frequency synthesizers to their respective frequency bands, that coincide with those of the filter stages of the diplexer as connected to the transmitter and receiver ports by the customer. The invention therefore obviates the need for the user to carry out parametric adjustments to set the operation of the radio.

While I have shown and described an embodiment in accordance with the present invention, it is to be understood that the same is not limited thereto but is susceptible to numerous changes and modifications as are known to a person skilled in the art, and I therefore do not wish to be limited to the details shown and described herein, but intend to cover all such changes and modifications as are obvious to one of ordinary skill in the art.

What is claimed:

1. For use with a transceiver that is tunable to transmit on either of first and second frequency bands and to receive on either of said first and second frequency bands, and including a first frequency band filter that is operative to pass signals in said first frequency band, and a second frequency band filter that is operative to pass signals in said second frequency band, a method of enabling said transceiver to be automatically tuned to transmit on a selected one of said first and second frequency bands and to receive on a selected other of said first and second frequency bands comprising the steps of:

(a) providing a high pass coupling between a first port of said first frequency band filter and filter circuitry of said first frequency band filter;

(b) providing a low pass coupling to a reference potential terminal between a first port of said second frequency band filter and filter circuitry of said second frequency band filter;

(c) coupling one of a transmit port and a receive port of said transceiver through a monitoring node to a prescribed voltage level;

(d) coupling one of said transmit port and said receive port of said transceiver to said first port of said first frequency band filter and coupling the other of said transmit port and said receive port of said transceiver to said first port of said second frequency band filter; and (e) monitoring the voltage level of said monitoring node, and tuning said transceiver to transmit on said first frequency band and to receive on said second frequency band, in response to a voltage level of said monitoring node having a first voltage level, but otherwise tuning said transceiver to transmit on said second frequency band and to receive on said first frequency band in response to said voltage level of said monitoring node having a second voltage level.

2. A method according to claim 1, wherein said transceiver includes a tunable transmit oscillator and a tunable receive oscillator, and wherein step (e) comprises tuning said tunable transmit oscillator to said first frequency band and said tunable receive oscillator to said second frequency band, in response to said voltage level of said monitoring node having said first voltage level, but otherwise tuning said tunable transmit oscillator to said second frequency band and said tunable receive oscillator to said first frequency band.

3. A method according to claim 1, wherein step (a) comprises providing a capacitance coupling between said first port of said first frequency band filter and filter circuitry of said first frequency band filter, and step (b) comprises providing an inductive coupling between said first port of said second frequency band filter and said reference potential terminal.

4. A method according to claim 2, wherein step (e) comprises monitoring the voltage level of said monitoring node by means of a transceiver tuning control processor, and wherein said transceiver tuning control processor is operative to automatically tune said tunable transmit and receive oscillators in accordance with the value of the voltage level at said monitoring node.

5. A method according to claim 1, wherein said first frequency band filter has a second port coupled in common with a second port of said second frequency band filter to a transmit-receive antenna.

6. A communication apparatus comprising:

a transceiver that is controllably tunable to transmit on one of an upper frequency band and a lower frequency band, and to receive on the other of said upper frequency band and said lower frequency band, and a transmit/receive filter having an upper band filter that is operative to pass signals in said upper frequency band and to effectively block signals in said lower frequency band, and a lower band filter section that is operative to pass signals in said lower frequency band and to effectively block signals in said upper frequency band, a transmit port of said transceiver being coupled to a first port of one of said upper and lower band filter sections, a receive port of said transceiver being coupled to a first port of the other of said upper and lower band filter sections, a first type of electrical impedance interface coupled between said first part of said upper band filter section and filter circuitry of said upper band filter section, a second type of electrical impedance interface coupled between said first port of said lower based filter section and filter circuitry of said lower based filter section, a voltage reference circuit coupled to one of said transmit port and said receive port of said transceiver, and a controller coupled to said one of said transmit port and said receive port of said transceiver and being operative to automatically tune said transceiver to transmit on said upper frequency band and to receive on said lower frequency band, in response to detecting a first voltage level in a circuit path between said voltage reference circuit and said one of said transmit ports and said receive port of said transceivers, but otherwise automatically tuning said transceiver to transmit on said lower frequency band end to receive on said upper frequency band, in response to detecting a second voltage level in said circuit path between said voltage level reference circuit and said one said transmit port and said receive port of said transceiver.

7. A communication apparatus according to claim 6, wherein said first type of electrical impedance interface comprises a capacitively coupled interface circuit between said first part of said upper band filter section and filter circuitry of said upper band filter section, and said second type of electrical impedance interface comprises an inductively coupled interface between said first part of said lower band filter section and a predetermined voltage reference terminal.

8. A communication apparatus according to claim 7, wherein said predetermined voltage reference terminal comprises a ground potential terminal, and said voltage reference circuit is coupled to a non-ground voltage reference terminal.

9. For use with a transceiver that is tunable to transmit on either of first and second frequency bands and to receive on either of said first and second frequency bands, and including a first frequency band filter that is operative to pass signals in said first frequency band, and a second frequency band filter that is operative to pass signals in said second frequency band, a method of enabling said transceiver to be automatically tuned to transmit on a selected one of said first and second frequency bands and to receive on a selected other of said first and second frequency bands comprising the steps of:

(a) incorporating first and second respectively different impedance coupling circuits into said first and second frequency band filters respectively;

(b) installing, in said transceiver, a logic level generator circuit which generates an output representative of connections between said first and second frequency band filters and transmit and receive ports of said transceiver; and (c) automatically tuning transmitter and receiver frequency synthesizers of said transceiver to the respective frequencies of said first and second frequency band filters in accordance with the output of said logic level generator circuit.

10. A method according to claim 9, wherein said first coupling circuit comprises a capacitive-coupling interface circuit that provides a first, low impedance path between a filter port and filter circuitry of said first frequency band filter, while effectively blocking DC, and said second coupling circuit comprises an inductive-coupling interface circuit that provides a second, low impedance path between a filter port and filter circuitry of said second frequency band filter, and a DC path from said filter port of said second frequency band filter to a reference potential terminal.

11. A method according to claim 10, wherein said logic level generator circuit comprises a pull-up resistor coupled between a prescribed voltage reference terminal and a frequency band monitoring node, which is DC-coupled to one of said first and second respectively different impedance coupling circuits of said first and second frequency band filters respectively.

* * * * *